US 6,206,046 B1

(12) United States Patent
Finley

(10) Patent No.: US 6,206,046 B1
(45) Date of Patent: Mar. 27, 2001

(54) LAWN AND GARDEN CHEMICAL DISPENSING SYSTEM

(76) Inventor: Robbie J. Finley, 1403 Deerfield Ct., Longmont, CO (US) 80501

( * ) Notice: Subject to any disclaimer, the term of this patent is extended or adjusted under 35 U.S.C. 154(b) by 0 days.

(21) Appl. No.: 09/511,406

(22) Filed: Feb. 23, 2000

(51) Int. Cl.[7] .................................................. F16K 5/00
(52) U.S. Cl. ............................ 137/893; 137/888; 239/201
(58) Field of Search .................................... 137/888, 893; 239/201

(56) References Cited

U.S. PATENT DOCUMENTS

| D. 345,411 | * | 3/1994 | Jernigan, Sr. ...................... D23/207 |
|---|---|---|---|
| 1,855,323 | | 4/1932 | Sirch . |
| 3,118,462 | | 1/1964 | Pannutti . |
| 3,943,960 | | 3/1976 | Syrenne . |
| 3,968,932 | | 7/1976 | Kimmell ............................. 239/142 |
| 3,974,847 | | 8/1976 | Hodges . |
| 4,026,673 | | 5/1977 | Russo .................................... 23/272 |
| 4,115,270 | | 9/1978 | Phillips ................................ 210/169 |
| 4,250,910 | | 2/1981 | King ..................................... 137/268 |
| 4,250,911 | | 2/1981 | Kratz .................................... 137/268 |
| 4,333,493 | | 6/1982 | Smiesko et al. .................... 137/268 |
| 4,555,347 | | 11/1985 | O'Dowd et al. .................... 210/752 |
| 5,178,181 | | 1/1993 | Craig .................................... 137/268 |
| 5,246,168 | | 9/1993 | Williams ............................. 239/313 |
| 5,301,718 | * | 4/1994 | Bolhofner ............................ 137/893 |
| 5,303,729 | | 4/1994 | DeMarco ............................. 137/268 |
| 5,353,990 | | 10/1994 | Williams ............................. 239/313 |
| 5,364,030 | | 11/1994 | Murdock et al. .................... 239/110 |
| 5,653,261 | * | 8/1997 | Dalhart et al. ...................... 137/893 |
| 5,666,987 | | 9/1997 | Combs .................................... 137/1 |

* cited by examiner

Primary Examiner—A. Michael Chambers
Assistant Examiner—Thomas L. McShane

(57) ABSTRACT

A water flow controlled dispenser of liquid or water-soluble beneficial chemicals for sprinkling systems.

6 Claims, 1 Drawing Sheet

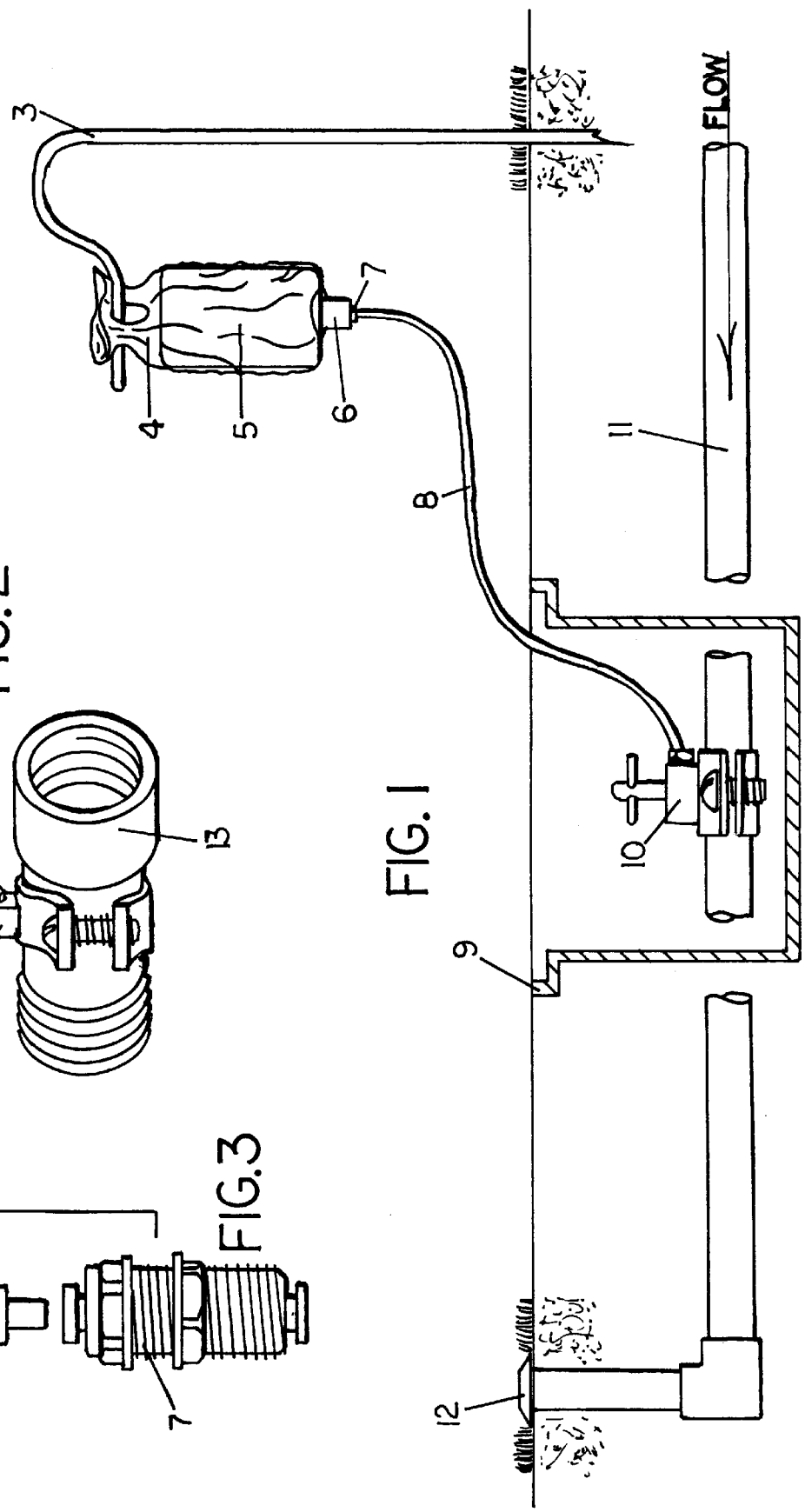

LAWN AND GARDEN CHEMICAL DISPENSING SYSTEM

BACKGROUND-FIELD OF INVENTION

This invention relates to fertigation and chemical dispensing systems for lawns and gardens.

BACKGROUND-DESCRIPTION OF PRIOR ART

A wide variety of devices for feeding plant fertilizer to a continuously flowing stream of water are known. Such devices are used, for example, for fertilizing and applying beneficial chemicals to lawn and garden areas.

A review of the currently available devices and systems reveals them to be complex, expensive, time consuming and/or unsightly.

Also, a review of existing devices and systems reveals them to be difficult to install, use, and maintain. The difficulty of installation of many existing devices to a new or existing system has deterred most lay persons from installing these devices. Many of them require professional installation.

Many of the existing devices are limited to attachment to either an above ground system or a subterranean. Rarely are they adaptable to both. Many of those made available for subterranean attachment require additional unwanted excavations to accommodate their bulky designs.

Very few devices or systems address disconnection or intentional disabling of their systems should the need dictate.

Many existing systems procedures require close attention to water ratios and their distribution. The complexity of these devices can easily explain why such devices have not achieved wide acceptance in the art. Those systems requiring elaborate mixing, dispersion and even pumping devices have also not achieved wide acceptance in the art.

U.S. Pat. No. 3,974,847(Hodges), U.S. Pat. No. 3,943,960(Syrenne), U.S. Pat. No. 3,118,462(Pannutti), and U.S. Pat. No. 1,855,323(Sirch) incorporate complex valves, intricate linkages, and expensive fittings to disperse and apply chemicals. These designs employ an overabundance of hardware which increase manufacturing cost, consumer price, and maintenance fees. As a result, the foregoing have met with little consumer approval.

U.S. Pat. No. 3,351,290 to Baldwin suggests the supporting ring-type stand 'preferably [be] screened from view behind shrubbery', suggesting it lacks aesthetic appeal.

SUMMARY

The present invention provides for easy attachment to water flow system for the application of fertilizers and other beneficial chemicals to lawn and/or garden areas. The invention consists of a stand, a chemical vessel, a vessel sleeve, a vessel cap with dual port (internal/external) bulkhead union, an optional filter attachment, a chemical feed tube, and a control valve tap connected to a water flow supply.

OBJECTS AND ADVANTAGES

Several objects and advantages of my invention include:

A) The stand serves to keep the vessel from sitting on the ground. It is also used for aesthetics. The whimsical look of a medical IV gives this system a memorable advantage over many existing systems on today's market. The stand can be made of a variety of materials. It can be so fashioned so as to decorate a user's yard or garden. Landscapers are widely using ornamental iron in yards and gardens, nowadays. This stand could easily be shaped to achieve a decorative element, without sacrificing utility. A variety of inexpensive materials may be used. Where it may be impractical to shove the stand into the ground, an above ground stand with legs may be used equally as well.

B) The leak-proof vessel will contain beneficial chemicals to be distributed. Because the vessel can be manufactured inexpensively from plastic or some similar material, it can be discarded after each use. A new vessel with new or different beneficial chemicals can be easily reattached to the vessel cap when the consumer is ready. The disposable vessel would allow for pre-mixed pre-packaged chemical solutions designed specifically for the individual needs of each consumer. These needs include, but are not limited to: coverage per square footage, specific pest problems, climactic zone needs and soil needs per type.

C) The vessel sleeve, also inexpensive to manufacture, can be manufactured with decorative or functional printings; designs, chemical manufacturer logos or brand names, warnings (as to chemical type/application) or other useful decorations or writings are some examples. The sleeve could be made from such things as woven materials, decorative cloths, or (as submitted) a simple "plastic bag" type sleeve.

D) The leak-proof vessel cap is fitted with a dual port bulkhead union. The external port has a quick fit coupling to receive the chemical feed tubing. The internal port also has a quick fit coupling to receive an internal filter to allow only liquid chemical passage. The internal filter would allow for the use of dissolvable granular or solid chemicals in the vessel. The cap allows for quick connection and disconnection for the consumer. A replacement dosage of beneficial chemicals can quickly and easily be attached to the system.

E) The chemical feed tube is the connection between the cap and external bulkhead and the control valve. It, too, could be brightly colored and incorporated into the decorative design of the invention. It, too, could be used for advertisement or warnings or other similar uses similar to that of the vessel sleeve.

F) The control valve tap allows for easy installation. A saddled clamp requires the consumer to merely drill a hole and attach the valve, thus, eliminating consumer's fears of incompetence or failure. If a self piercing valve is used, it further reduces the anxiety of attachment by the consumer by eliminating need for drilling.

G) The system can easily be fitted to be used where the consumer needs coverage by tapping an adapter for a garden hose. The rest of the system remaining the same, the invention, as a unit, may be easily relocated. The adapter is threaded to receive and continue on with an ordinary pair of garden hoses.

H) This device can be attached any where along the sprinkler system lines. It can be used to dispense beneficial chemicals to an entire system by attaching it prior to the sprinkler system's manifold or it may be attached to a single zone if the consumer so desires it.

I) This invention does not require the system to be monitored during chemical application. If the consumer so desires, with a garden hose attachment, he may monitor the system for exact location(s) of application.

J) The invention's attachment requires no professional skills to install. Familiarity with a drill and a screwdriver is enough to install the device.

K) Because the invention attaches at the level of the water supply line, there is no additional excavation needed for attachment.

L) If this invention needs to be disconnected for seasonal or other needs, the valve allows for blowout of the device by merely removing the vessel from the device with the valve open. The chemical feed may be shut off merely by closing the valve at the control valve tap, thus, preventing any unwanted flow or leakage.

BRIEF DESCRIPTION OF THE DRAWINGS

FIG. 1 is a perspective view of my invention connected in series to a suitable underground system.

FIG. 2 depicts attachment of my invention to a garden hose adapter.

FIG. 3 is a detailed view of the filter attachment to the interior port of the bulkhead union.

REFERENCE NUMERALS IN DRAWINGS

3-Stand
4-Vessel Sleeve
5-Vessel
6-Vessel Cap
7-Bulkhead Union with Chemical Feed Tubing Ports
8-Chemical Feed Tubing
9-Cross Sectional View of Sprinkler System Vault
10-Control Valve Tap
11-Sprinkler Pipe (Water supply line)
12-Sprinkler Head
13-Adapter (To use invention with standard garden hoses)
14-Filter

DESCRIPTION OF THE PREFERRED EMBODIMENT

The preferred embodiments depicted in FIG. 1 and FIG. 2 of the present invention and the manner in which these embodiments are used to dispense dissolved beneficial chemicals are so illustrated. In FIG. 1 it is illustrated how the dispensing system for beneficial chemicals is connected in a lawn or garden sprinkler installation. In FIG. 2 it is illustrated how the dispensing system for beneficial chemicals is connected in a lawn or garden watering system that utilizes a garden hose(s). Both of these receive water from a source through a pipe 11 or hose(s). A sprinkler pipe 11 may lead to singular sprinkler head 12 or a plurality of heads or zones. A control valve tap 10 enables the user to attach the dispensing system to existing sprinkler systems, preferably in the sprinkler system manifold vault 9 and also enables the user to control the rate at which the beneficial chemicals enter the sprinkler system. A chemical feed tube 8 is interconnected in the dispensing system between the control valve tap 10 and a bulkhead union 7. The bulkhead union 7 is equipped with an external and an internal port. The external port of the bulkhead union 7 receives a chemical feed tubing 8 and the internal port of the bulkhead union 7 receives a filter 14. The filter 14 is attached when it is desirable to use beneficial chemicals that are in non-liquid, water soluble, form. The filter 14 is selected such that it will not allow any particles larger than a specific size to pass beyond the vessel 5. The bulkhead union 7 is attached to a vessel cap 6. The leak-proof vessel cap 6 attaches onto a vessel 5. The vessel 5 can be reused for repeat applications of beneficial chemicals. However, it is preferred that the vessel 5 be replaced with each new dosage of said beneficial chemical for application. In this preferred embodiment the vessel 5 is suspended from a stand 3 utilizing a vessel sleeve 4. The vessel sleeve 4 encases the vessel 5 allowing the vessel 5 to be suspended.

OPERATION

For operation:(charged sprinkler system)
1) Close control valve tap 10.
2) Add beneficial chemicals to the vessel 5 (if deplete of beneficial chemical) or,
    a) open (new) vessel 5 full of beneficial chemical. Do not remove new vessel sleeve 4.
    b) if using any form of beneficial chemical not in liquid form it is necessary to insert filter 14, to prevent clogging.
3) Seal the vessel 5 with the vessel cap 6 by screwing the cap on securely.
4) With the vessel 5, in the vessel sleeve 4, hang the vessel 5 and vessel sleeve 4, from the stand 3.
5) Open the valve at the control valve tap 10.
6) Run the sprinkler system as you normally would.

With the control valve tap 10 opened and the sprinkler system charged, a certain amount of displacement water flows into the vessel 5, thus, evacuating the beneficial chemical through the chemical feed tubing 8 and then through the control valve tap 10 distributing the beneficial chemical to its intended target area(s) via the existing sprinkler system.

ALTERNATIVE EMBODIMENTS

There are various possibilities with regard to this dispensing system. The stand 3 in the preferred embodiment is purely functional, whereas, it could be so fashioned so as to be ornamental. The vessel 5 and the vessel sleeve 6 could be manufactured so as to be one unit. The control valve tap 10 could be some other connection, say a T-connection with a shut-off valve attached to it. Though this would make attachment to the existing system more difficult for most consumers, but, it might give the appearance of a more permanent connection, even though the function would not inherently improve.

CONCLUSION, RAMIFICATIONS AND SCOPE

Accordingly, the reader will see that the invention can be used to dispense beneficial chemicals to lawns and gardens easily and conveniently, can be installed quickly and easily, and can be made to be whimsical, ornamental and/or decorative.

In addition, this dispensing system allows the consumer to customize their chemical applications to lawn and garden areas based on their individual needs. The dispensing system all was for all of these particulars without impairing the ability of the existing sprinkler system.

Furthermore, the dispensing system has the additional advantages in that:

it allows the user to use the dispensing system as either a stationary unit or a mobile unit.

its vessel sleeve provides spaces to be used for exhibiting designs or writings, to include, but not limited to, advertising or chemical application warnings.

it can be installed above or below ground, neither of which will result in a loss of effectiveness.

it permits use of various non-liquid forms of chemicals i.e., granular, pelletized and tablet with the filter inserted.

it can be used on extreme slopes and grades with no loss in effectiveness, nor, does it require any adjustment to go immediately from one grade to another.

it permits the chemicals in the vessel to be color coded to distinguish the specificity of beneficial chemicals as well as a visual aid for the consumer as to depletion of beneficial chemical remaining in the vessel.

While I have described the herein dispensing system in specific detail, it will be appreciated by those skilled in the art that the structure, shapes and proportions thereof may be susceptible to variations, alterations and/or modifications without departing from the spirit or scope of the invention therein, as set forth in the appended claims.

I claim:

1. A water flow controlled means for introducing chemicals into a water flow comprising:

a vessel means for holding chemicals to be dispersed, said vessel having an open end;

a sleeving means for encasing said vessel means so that the said vessel means may be suspended from a stand;

a vessel stand for providing a dangling means for said vessel sleeving means and its encased said vessel means;

a vessel cap with means so that the said vessel means may be sealed with said vessel cap rendering the said vessel means leak-proof;

a multiple ported bulkhead means attached to said vessel cap to provide a means for attachment of interior apparatus in relationship to the interior of said vessel cap and a means for attachment of exterior apparatus in relationship to the exterior of said vessel cap;

a filtering means attached to the interior port of the said multiple port bulkhead means for restricting solid particulates of a predetermined size from evacuation from said vessel means;

a tubing means providing for the flow communication between the water flow by way of said filtering means into said vessel means and conversely for providing for the flow of said chemical, in diluted form, by way of filtering means to evacuate from the said vessel means;

a control valve tap means provide an attachment to the main water supply; and, said control valve tap means provide adjustment for the flow rate of the confluence of the water supply flow and, heretofore, the resulting diluted chemical flow.

2. A means according to claim 1, wherein said vessel means further includes said vessel means so manufactured as to incorporate a fastened suspension apparatus.

3. A means according to claim 1, wherein said vessel means further includes said vessel means so manufactured as to incorporate a fastened suspension stand.

4. A means according to claim 1, wherein said vessel stand comprises a plurality of support members for stability.

5. A means according to claim 1, wherein said filtering means further includes said filtering means so manufactured as to regulate volume of confluence of the flows, thereby eliminating need for flow regulation at said control valve tap means.

6. A means according to claim 1, wherein said vessel means further includes said vessel sleeve means, said vessel cap, said filtering means, said tubing means and said control valve means so manufactured as to be fastened as a singular component.

* * * * *